(12) United States Patent
Ohmori et al.

(10) Patent No.: US 7,968,246 B2
(45) Date of Patent: Jun. 28, 2011

(54) SOLID OXIDE FUEL CELL

(75) Inventors: Makoto Ohmori, Nagoya (JP); Natsumi Shimogawa, Nagoya (JP); Tsutomu Nanataki, Toyoake (JP); Toshiyuki Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 784 days.

(21) Appl. No.: 12/039,790

(22) Filed: Feb. 29, 2008

(65) Prior Publication Data
US 2008/0292932 A1 Nov. 27, 2008

(30) Foreign Application Priority Data

May 22, 2007 (JP) ................. 2007-135426
Nov. 27, 2007 (JP) ................. 2007-305173

(51) Int. Cl.
*H01M 8/10* (2006.01)
(52) U.S. Cl. ....................................... 429/479
(58) Field of Classification Search ............. 429/479
See application file for complete search history.

(56) References Cited

U.S. PATENT DOCUMENTS

| 5,378,247 | A | 1/1995 | Sasaki et al. |
| 7,323,268 | B2 | 1/2008 | Robert |
| 2006/0141320 | A1* | 6/2006 | Sato et al. ................. 429/34 |

FOREIGN PATENT DOCUMENTS

| EP | 1 199 760 A1 | 4/2002 |
| JP | 2004-342584 A1 | 12/2004 |
| WO | 92/02057 A1 | 2/1992 |
| WO | 2005/112164 A1 | 11/2005 |

* cited by examiner

*Primary Examiner* — Patrick Ryan
*Assistant Examiner* — Brent Thomas
(74) *Attorney, Agent, or Firm* — Burr & Brown

(57) ABSTRACT

A fuel cell has a stack structure in which fired sheet bodies (laminates each including a fuel electrode layer, a solid electrolyte layer, and an air electrode layer) and support members for supporting the sheet bodies are stacked in alternating layers. Each of the sheet bodies is warped downward (toward an air-electrode-layer side). Because of a magnitude relationship of thermal expansion coefficient among the layers in the sheet body and that between the support member and the sheet body, a warp height gradually lessens in the course of temperature rise at start-up. However, even when a working temperature (800° C. or the like) is reached, the sheet bodies are still warped downward. By virtue of presence of the warp, the sheet bodies become unlikely to be deformed at the working temperature.

6 Claims, 11 Drawing Sheets

SOLID OXIDE FUEL CELL

BACKGROUND OF THE INVENTION

1. Field of the Invention

The present invention relates to a solid oxide fuel cell (SOFC), and particularly to a stack structure (a flat-plate stack structure) in which sheet bodies and support members for supporting the sheet bodies are stacked in alternating layers. The sheet body may also be referred to as the "single cell," and the support member may also be referred to as the "interconnector."

2. Description of the Related Art

Conventionally, a solid oxide fuel cell having the above-mentioned stack structure has been known (refer to, for example, Japanese Patent Application Laid-Open (kokai) No. 2004-342584). In this case, the sheet body can be a fired body in which a solid electrolyte layer formed from zirconia, a fuel electrode layer, and an air electrode layer are arranged in layers such that the fuel electrode layer is formed on the upper surface of the solid electrolyte layer and such that the air electrode layer is formed on the lower surface of the solid electrolyte layer. Hereinafter, the support member adjacent to the upper side of each of the sheet bodies may also be referred to as the "upper support member," and the support member adjacent to the lower side of each of the sheet bodies may also be referred to as the "lower support member."

The support member can be configured to have a plane portion and a frame portion, which is provided along the overall perimeter of the plane portion and whose thickness is greater than that of the plane portion. In this case, each of the sheet bodies is held between the upper and lower support members such that an overall perimetric portion of the sheet body is sandwiched between the frame portion of the upper support member and the frame portion of the lower support member. By employment of this configuration, the lower surface of the plane portion of the upper support member, the inner wall surface of the frame portion of the upper support member, and the upper surface of the fuel electrode layer of the sheet body can define a fuel flow channel to which a fuel gas is supplied. Similarly, the upper surface of the plane portion of the lower support member, the inner wall surface of the frame portion of the lower support member, and the lower surface of the air electrode layer of the sheet body can define an air flow channel to which a gas (air) that contains oxygen is supplied.

According to the above configuration, in a state in which the sheet bodies are heated to a working temperature of the solid oxide fuel cell (e.g., 800° C.; hereinafter, merely referred to as the "working temperature"), a fuel gas and air are supplied to the fuel flow channels and to the air flow channels, respectively, whereby the fuel gas and air come into contact with the upper surfaces and the lower surfaces, respectively, of the sheet bodies. As a result, electricity-generating reactions occur in the sheet bodies.

Meanwhile, when the fuel gas and air supplied to the fuel flow channel and the air flow channel, respectively, differ in pressure (hereinafter, referred to merely as having a "pressure difference"), the pressure difference acts on the sheet body as an external force oriented perpendicularly to a planar direction of the sheet body (hereinafter, may be referred to merely as the "planar direction"). As a result, the greater the pressure difference, the greater the extent to which the sheet body (particularly, a portion around the center (hereinafter referred to as a "near center portion") of the sheet body) can be deformed.

In the above-mentioned stack structure, the pressure difference can vary among the sheet bodies due to, for example, the fact that the flow rate of gas supplied to the flow channel can vary among the sheet bodies. Accordingly, the quantity of deformation of the sheet body (particularly, a near center portion of the sheet body) can vary among the sheet bodies.

Additionally, in recent years, in order to, for example, reduce the size of SOFC and lower internal electrical resistance, an attempt to form very thin sheet bodies and support members (particularly, very thin sheet bodies) has been carried out. When a sheet body is formed very thin, a support portion of the sheet body (a layer for supporting the sheet body) also becomes very thin. Accordingly, for a given pressure difference, the quantity of deformation of the sheet body increases. That is, for a given variation in the pressure difference among the sheet bodies, the quantity of deformation of the sheet body varies to a greater extent among the sheet bodies.

When the sheet body (particularly, a near center portion of the sheet body) is deformed, pressure loss associated with flow of fluid through the flow channel varies, so that the gas flow rate varies. This can cause variation in electricity-generating characteristics of the sheet body. Therefore, in order for the SOFC as a whole to stably exhibit expected electricity-generating characteristics, it is preferred to restrain variation in the quantity of deformation of the sheet body among the sheet bodies caused by variation in the pressure difference among the sheet bodies. This is the reason for a demand for the sheet body to be unlikely to be deformed at a working temperature upon subjection to an external force induced by the pressure difference.

SUMMARY OF THE INVENTION

In view of the foregoing, an object of the present invention is to provide a small-sized solid oxide fuel cell having a (flat-plate) stack structure in which sheet bodies and support members are stacked in alternating layers, each of the sheet bodies being a fired laminate of a fuel electrode layer, a solid electrolyte layer, and an air electrode layer, and in which the sheet bodies are unlikely to be deformed at the working temperature upon subjection to an external force induced by the pressure difference between a fuel gas and a gas which contains oxygen.

To achieve the above object, a solid oxide fuel cell (SOFC) according to the present invention is configured such that a single or a plurality of sheet bodies and a plurality of support members are stacked in alternating layers. Each of the sheet bodies is a fired laminate of a solid electrolyte layer, a fuel electrode layer formed on an upper surface of the solid electrolyte layer, and an air electrode layer formed on a lower surface of the solid electrolyte layer. Each of the support members has a plane portion and a frame portion. In view of reduction in the overall size of the SOFC, preferably, each of the sheet bodies has a thickness of 20 µm to 500 µm inclusive and has a uniform distribution of thickness all over the sheet body.

Also, each of the sheet bodies is held between an upper support member and a lower support member such that an overall perimetric portion of the sheet body is sandwiched between the frame portion of the upper support member and the frame portion of the lower support member (preferably, in an airtight condition), whereby a lower surface of the plane portion of the upper support member, an inner wall surface of the frame portion of the upper support member, and an upper surface of the fuel electrode layer of the sheet body define a fuel flow channel to which a fuel gas is supplied, and an upper surface of the plane portion of the lower support member, an inner wall surface of the frame portion of the lower support member, and a lower surface of the air electrode layer of the sheet body define an air flow channel to which a gas (air or the like) that contains oxygen is supplied.

The SOFC according to the present invention is characterized in that the sheet bodies are warped downward at room temperature and at a working temperature of the solid oxide fuel cell higher than room temperature, and that a warp height of each of the sheet bodies along a direction perpendicular to the planar direction of the sheet body is lower at the working temperature than at room temperature (under the condition that no gases are supplied).

In order to implement the above configurational feature, for example, each of the sheet bodies is configured such that a thermal expansion coefficient of the fuel electrode layer is higher than that of the solid electrolyte layer and such that a thermal expansion coefficient of the air electrode layer is substantially equal to that of the solid electrolyte layer, and a thermal expansion coefficient of the support member is higher than a mean thermal expansion coefficient of the sheet body. The expression "a thermal expansion coefficient of the air electrode layer is substantially equal to that of the solid electrolyte layer" means that, for example, the thermal expansion coefficient of the air electrode layer is equal to or higher than that of the solid electrolyte layer; is lower than that of the fuel electrode layer; and is closer to that of the solid electrolyte layer than is that of the fuel electrode layer.

Through employment of the above magnitude relationship of thermal expansion coefficient among the layers in the sheet body, the sheet body which is warped downward (i.e., toward an air-electrode-layer side) at room temperature can be readily produced by utilizing internal stress (thermal stress) induced by difference in the quantity of post-firing contraction among the layers.

Additionally, through employment of the above magnitude relationship of thermal expansion coefficient between the support member and the sheet body, in the course of gradually raising the temperature of the SOFC through application of heat from room temperature toward the working temperature, a gradual increase occurs in a tensile force which is oriented along the planar direction of the sheet body and which the sheet body receives from the upper and lower support members. As a result, a downward warp height of the sheet body gradually lessens. Notably, in the course of gradually raising the temperature of the SOFC from room temperature toward the working temperature, a difference in expansion among the layers in the sheet body caused by the above magnitude relationship of thermal expansion coefficient among the layers can also bring about a gradual reduction in downward warp height of the sheet body.

An overall perimetric portion of the sheet body may be bonded, by use of a predetermined bonding agent or the like, to the frame portions of the upper and lower support members in such a manner as to completely disable relative movement or in such a manner as to allow some relative movement only at a predetermined temperature or higher.

As understood from the above, the above configuration readily enables implementation of the SOFC in which the sheet bodies are warped downward (i.e., toward the air-electrode-layer side) at room temperature and at the working temperature (under the condition that no gases are supplied) and in which the warp height of each of the sheet bodies is lower at the working temperature than at room temperature.

According to the SOFC having the above configuration, at the working temperature (and under the condition that no gases are supplied), the sheet bodies are warped downward (i.e., toward the air-electrode-layer side). Accordingly, as compared with an SOFC having such a configuration that the sheet bodies are not warped at the working temperature, the sheet bodies become less likely to be deformed at the working temperature upon subjection to an external force induced by the aforementioned pressure difference and oriented perpendicularly to the planar direction. As a result, there can be restrained variation in the quantity of deformation of the sheet body among the sheet bodies caused by variation in the pressure difference among the sheet bodies. Thus, the SOFC as a whole can stably exhibit expected electricity-generating characteristics.

Generally, in the case where the sheet body (particularly, a near center portion of the sheet body) is warped, the sheet body tends to be less deformed upon subjection to an external force oriented perpendicularly to the planar direction and oriented toward a concave side from a convex side than upon subjection to an external force oriented perpendicularly to the planar direction and oriented toward the convex side from the concave side. That is, in the case where the sheet body is warped downward (i.e., toward the air-electrode-layer side), upon imposition of an upward external force (i.e., an external force oriented toward a fuel-electrode-layer side from the air-electrode-layer side) on the sheet body, a "warp-induced deformation restraint effect" is exhibited to a greater extent.

Meanwhile, with the view to the ratio between oxygen molecules and fuel (hydrogen) molecules to be consumed in electricity-generating reactions (refer to Chemical Reaction Formulas (1) and (2), which will be described later) of the solid oxide fuel cell and the proportion of oxygen molecules in air, generally, the flow rate of air to be supplied to the air flow channel is set higher than that of a fuel gas to be supplied to the fuel flow channel. In this case, the pressure of air to be supplied to the air flow channel becomes higher than that of the fuel gas to be supplied to the fuel flow channel. As a result, the pressure difference causes an upward external force (i.e., an external force oriented toward the fuel-electrode-layer side from the air-electrode-layer side) to act on the sheet bodies. Accordingly, in the case where the flow rate of air to be supplied to the air flow channel is set higher than that of the fuel gas to be supplied to the fuel flow channel, downward warpage (i.e., warpage toward the air-electrode-layer side) of the sheet body as in the case of the above configuration enables the "warp-induced deformation restraint effect" to be exhibited to a greater extent.

When the sheet body (particularly, a near center portion of the sheet body) is warped downward (i.e., toward the air-electrode-layer side), as viewed in plane (as viewed from above), a near center portion of the air flow channel becomes lower in air-flow-channel height than in the remaining portion of the air flow channel. This can bring about a phenomenon in which, as viewed in plane, the flow velocity of air drops at a near center portion of the air flow channel and increases at the remaining portion of the air flow channel. As a result, the following has been ascertained: particularly, in the case where, as viewed in plane, an air inflow hole and an air outflow hole of the air flow channel are arranged such that a line segment connecting the air inflow and outflow holes passes through a central portion of the air flow channel, the degree of nonuniform distribution of the flow velocity of air within the air flow channel can be lessened. Thus, through employment of such warpage of the sheet bodies, the efficiency of utilization of air in the electricity-generating reactions can be enhanced. Therefore, even at a high air utilization rate, a drop in output of the SOFC can be restrained.

In the SOFC according to the present invention, preferably, in each of the sheet bodies, a ratio ($X1/T1$; see FIG. 6; hereinafter referred to as the "room-temperature warp height ratio) of the warp height (X1) of the sheet body at room temperature to a height (T1) of the air flow channel along the direction perpendicular to the planar direction of the sheet body under a condition that the warp height of the sheet body is assumed to be zero is 0.05 to 0.8 inclusive.

Herein, the above-mentioned "height of the air flow channel" is specifically, for example, a distance between the upper surface of the plane portion and the upper surface of the frame portion of the lower support member as measured along the direction perpendicular to the planar direction. The "warp height of the sheet body" is specifically, for example, a distance between a perimetric portion of the sheet body and a bottom portion of the sheet body as measured along the direction perpendicular to the planar direction of the sheet body, the bottom portion being located at the lowest point of a near center portion of the sheet body.

For convenience of description, in the following description, a downward warp height (X1; see FIG. 6) of the sheet body at room temperature is referred to as the "room-temperature warp height," and a downward warp height (X2; see FIG. 7) of the sheet body at the working temperature is referred to as the "working-temperature warp height."

According to our findings of studies, when the room-temperature warp height ratio is less than 0.05, the working-temperature warp height becomes very low; as a result, the sheet body fails to sufficiently exhibit the deformation restraint effect against an external force induced by the aforementioned pressure difference. By contrast, when the room-temperature warp height ratio is in excess of 0.8, the working-temperature warp height still remains considerably high, causing an increase in pressure loss of air which flows through the air flow channel. Therefore, preferably, the room-temperature warp height ratio is 0.05 to 0.8 inclusive.

In the case where the room-temperature warp height ratio falls in the above range, in view of reduction in the overall size of the SOFC, preferably, the height (T1) of the air flow channel is 50 μm to 700 μm inclusive.

Additionally, in the case where the height (T) of the air flow channel falls in the above range and where, as viewed in plane, the plane portion of the support member assumes a square shape, a rectangular shape, a circular shape, or an elliptic shape, preferably, a length (L) of one side of the square shape, a length (L) of a short side of the rectangular shape, a diameter (L) of the circular shape, or a minor diameter (L) of the elliptic shape is 4 mm to 190 mm inclusive.

Through employment of the above configurational feature, the degree (curvature) of warp of the sheet body at the working temperature can be such that the deformation restraint effect is sufficiently exhibited without generation of excessive internal stress. Notably, the dimensional range is specified for the length of one side of the square shape, the length of a short side of the rectangular shape, the diameter of the circular shape, or the minor diameter of the elliptic shape for the following reason.

A major warp of the sheet body tends to appear on a vertical section of the sheet body taken along a plane which includes a "minimum-width vertical section" of the plane portion of the support member. The minimum-width vertical section is a vertical section of the plane portion which is the shortest in width (a dimension measured along the planar direction) among various vertical sections of the plane portion including a near center portion of the support member (sections of the plane portion including a near center portion taken along planes perpendicular to the planar direction). Accordingly, the degree (curvature) of a major warp of the sheet body depends greatly on the width of the minimum-width vertical section. Meanwhile, in the case where, as viewed in plane, the plane portion of the support member assumes a square shape, a rectangular shape, a circular shape, or an elliptic shape, the width of the minimum-width vertical section coincides with the length of one side of the square shape, the length of a short side of the rectangular shape, the diameter of the circular shape, or the minor diameter of the elliptic shape. Therefore, in the case where, as viewed in plane, the plane portion of the support member assumes a square shape, a rectangular shape, a circular shape, or an elliptic shape, the degree (curvature) of a major warp of the sheet body depends greatly on the length of one side of the square shape, the length of a short side of the rectangular shape, the diameter of the circular shape, or the minor diameter of the elliptic shape.

DETAILED DESCRIPTION OF THE PREFERRED EMBODIMENT

A solid oxide fuel cell according to an embodiment of the present invention will next be described with reference to the drawings.

Figure 1:
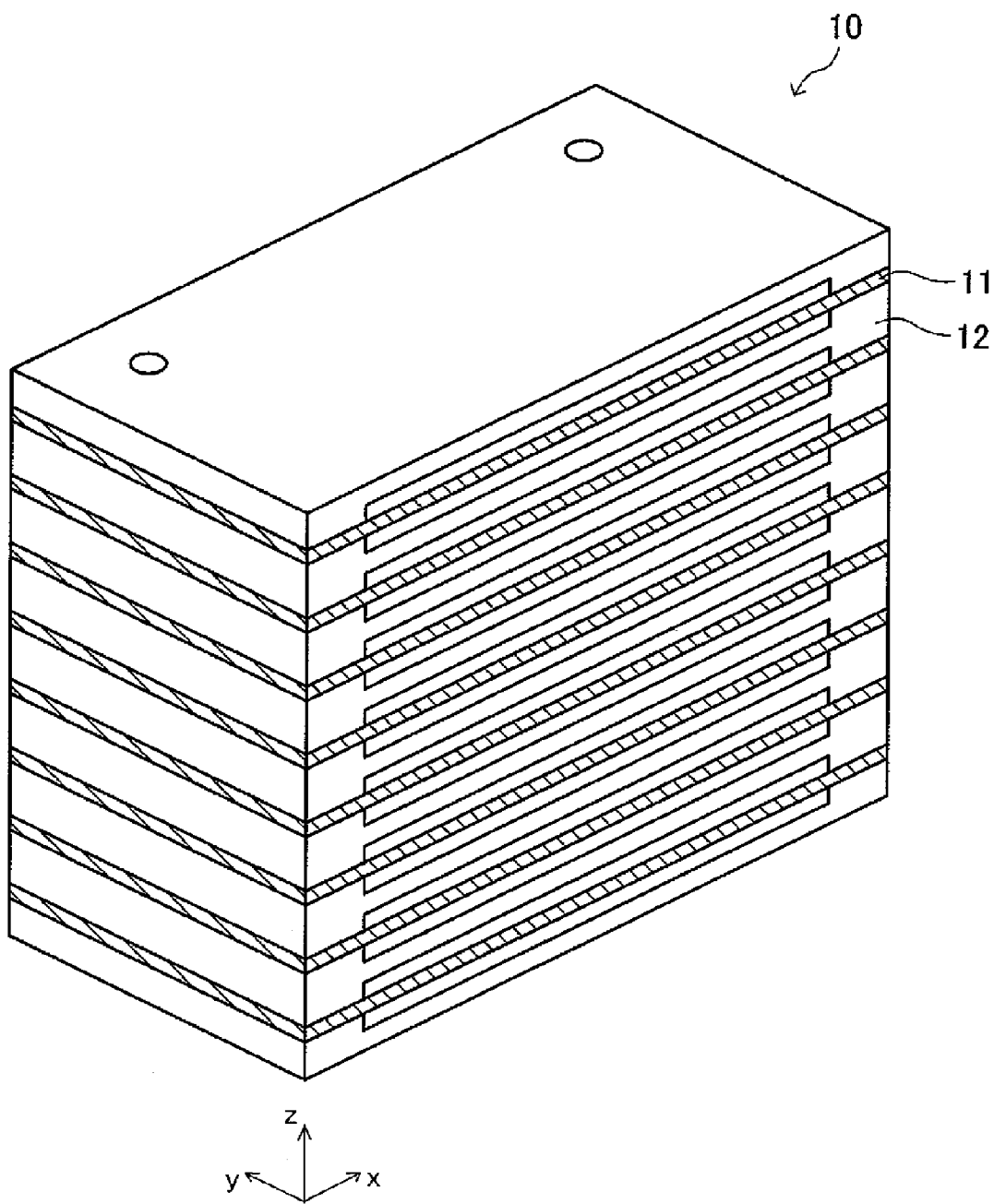
FIG. 1 is a perspective cutaway view of a solid oxide fuel cell according to an embodiment of the present invention.
Figure 2:
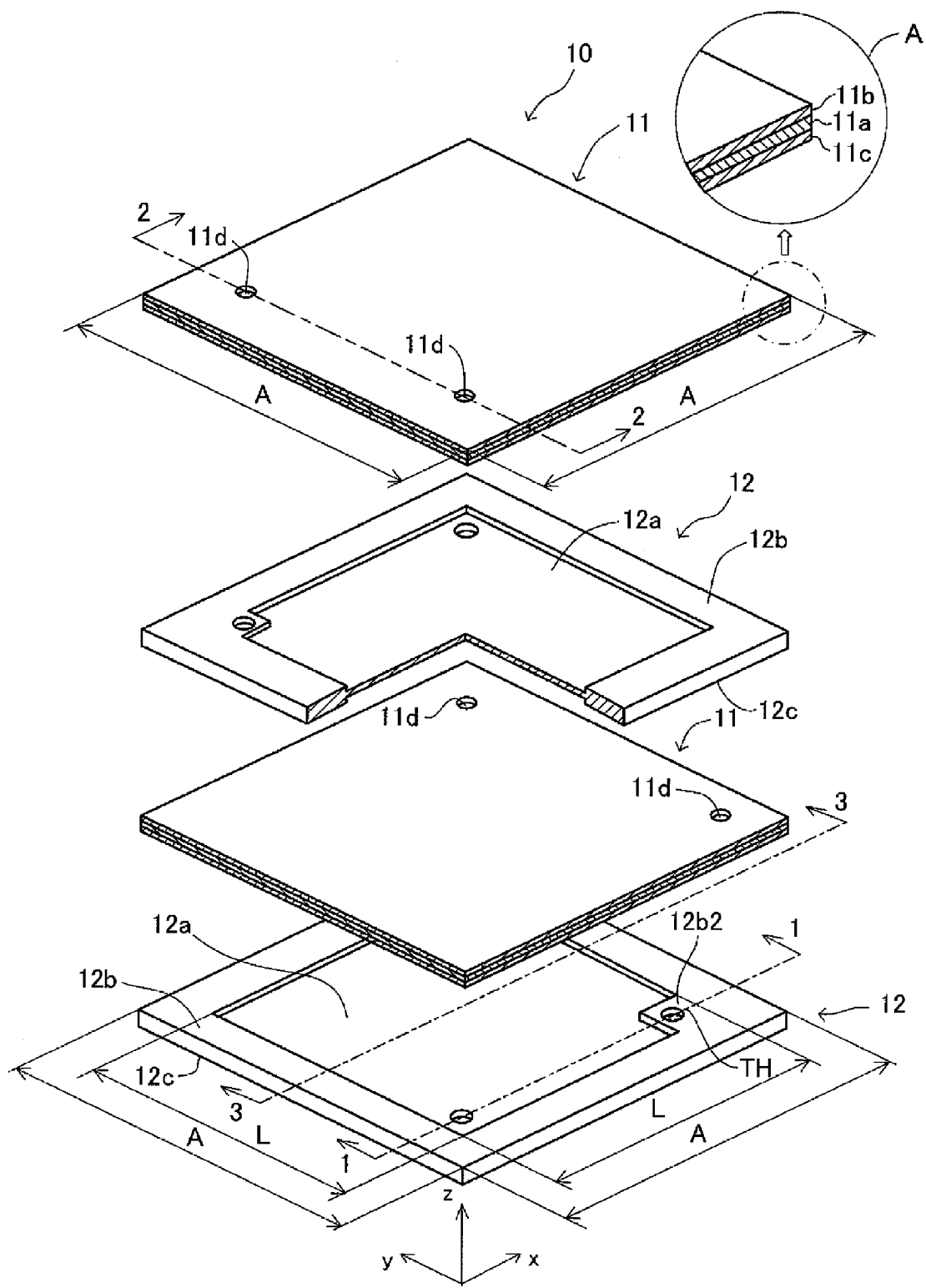
FIG. 2 is an exploded partial, perspective view of the fuel cell shown in FIG. 1.

Overall Structure of Fuel Cell:

FIG. 1 perspectively shows, in a cutaway fashion, a solid oxide fuel cell (hereinafter, referred to merely as the "fuel cell") 10, which is a device according to an embodiment of the present invention. FIG. 2 perspectively and partially shows, in an exploded fashion, the fuel cell 10. The fuel cell 10 is configured such that sheet bodies 11 and support members 12 are stacked in alternating layers. That is, the fuel cell 10 has a flat-plate stack structure. The sheet body 11 is also referred to as a "single cell" of the fuel cell 10. The support member 12 is also referred to as an "interconnector."

As shown on an enlarged scale within a circle A of FIG. 2, the sheet body 11 has an electrolyte layer (solid electrolyte layer) 11a, a fuel electrode layer 11b formed on the electrolyte layer 11a (on the upper surface of the electrolyte layer 11a), and an air electrode layer 11c formed on a side of the electrolyte layer 11a opposite the fuel electrode layer 11b (on the lower surface of the electrolyte layer 11a). The planar shape of the sheet body 11 is a square having sides (length of one side=A) extending along mutually orthogonal x- and y-axes. The sheet body 11 has a thickness along a z-axis orthogonal to the x-axis and the y-axis.

In the present embodiment, the electrolyte layer 11a is a dense fired body of YSZ (yttria-stabilized zirconia). The fuel electrode layer 11b is a fired body of Ni-YSZ and a porous electrode layer. The air electrode layer 11c is a fired body of LSM (La(Sr)MnO$_3$; lanthanum strontium manganite)-YSZ and a porous electrode layer. The electrolyte layer 11a, the fuel electrode layer 11b, and the air electrode layer 11c have room-temperature-to-1,000° C. mean thermal expansion coefficients of about 10.8 ppm/K, 12.5 ppm/K, and 11 (10.8) ppm/K, respectively.

That is, the thermal expansion coefficient of the fuel electrode layer 11b is higher than that of the electrolyte layer 11a, and the thermal expansion coefficient of the air electrode layer 11c is substantially equal to that of the electrolyte layer 11a. Accordingly, when the temperature of the fuel cell 10 varies, a difference in expansion or contraction arises among the layers in the sheet body 11.

The sheet body 11 has a pair of cell through-holes 11d. Each of the cell through-holes 11d extends through the electrolyte layer 11a, the fuel electrode layer 11b, and the air electrode layer 11c. The paired cell through-holes 11d are formed in the vicinity of one side of the sheet body 11 and in the vicinity of corresponding opposite ends of the side.

Figure 3:
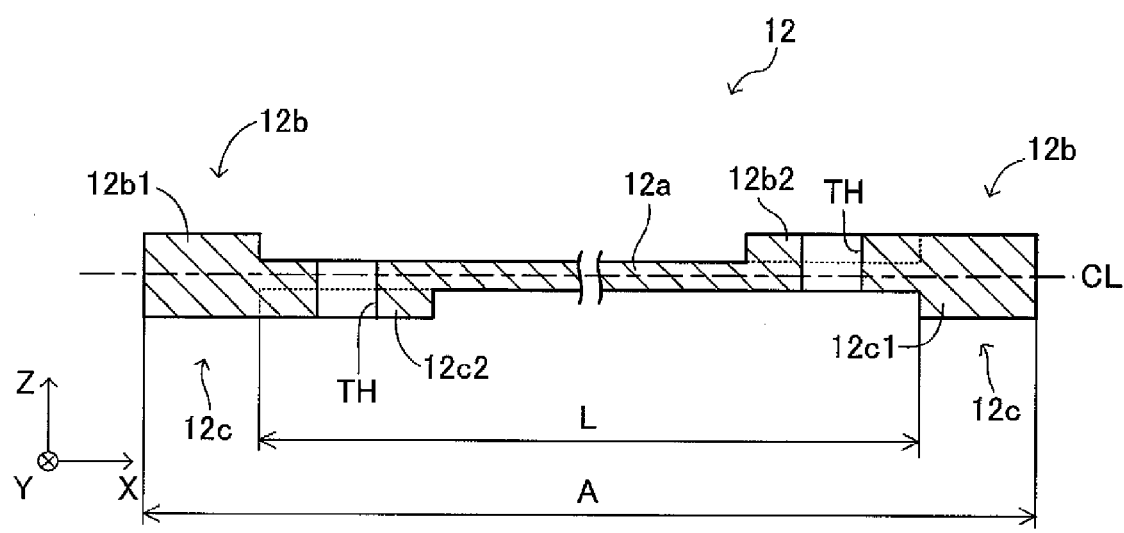
FIG. 3 is a sectional view of a support member taken along a plane which includes line 1-1 of FIG. 2 and is in parallel with an x-z plane.

FIG. 3 is a sectional view of the support member 12 taken along a plane which includes line 1-1 of FIG. 2 parallel with the x-axis and is in parallel with the x-z plane.

As shown in FIGS. 2 and 3, the support member 12 includes a plane portion 12a, an upper frame portion 12b, and a lower frame portion 12c. The upper frame portion 12b and the lower frame portion 12c collectively correspond to the aforementioned "frame portion." The planar shape of the support member 12 is a square having sides (length of one side=A) extending along the mutually orthogonal x- and y-axes and is identical with that of the sheet body 11.

The support member 12 is formed from an Ni-based heat-resistant alloy (e.g., ferritic SUS, INCONEL 600, or HASTELLOY). The support member 12 formed from, for example, SUS430, which is a ferritic SUS, has a room-temperature-to-1,000° C. mean thermal expansion coefficient of about 12.5 ppm/K. Thus, the thermal expansion coefficient of the support member 12 is higher than that of the sheet body 11. Accordingly, when the temperature of the fuel cell 10 varies, a difference in expansion or contraction arises between the sheet body 11 and the support member 12.

The plane portion 12a is a thin, flat body having a thickness along the z-axis. The planar shape of the plane portion 12a is a square having sides (length of one side=L(<A)) extending along the x-axis and the y-axis.

The upper frame portion 12b is a frame body provided around the plane portion 12a (in a region in the vicinity of the four sides of the plane portion 12a; i.e., an outer peripheral region of the plane portion 12a) in an upwardly facing condition. The upper frame portion 12b consists of a perimetric frame portion 12b1 and a jutting portion 12b2.

The perimetric frame portion 12b1 is located on a side toward the perimeter of the support member 12. The vertical section of the perimetric frame portion 12b1 (e.g., a section of the perimetric frame portion 12b1 whose longitudinal direction coincides with the direction of the y-axis, taken along a plane parallel with the x-z plane) assumes a rectangular shape (or a square shape).

The jutting portion 12b2 juts toward the center of the support member 12 from the inner peripheral surface of the perimetric frame portion 12b1 at one of four corner portions of the plane portion 12a. The lower surface of the jutting portion 12b2 is integral with the plane portion 12a. The shape of the jutting portion 12b2 as viewed in plane is substantially square. The upper surface (plane) of the jutting portion 12b2 is continuous with the upper surface (plane) of the perimetric frame portion 12b1. The jutting portion 12b2 has a through-hole TH formed therein. The through-hole TH also extends through a portion of the plane portion 12a which is located under the jutting portion 12b2.

The lower frame portion 12c is a frame body provided around the plane portion 12a (in a region in the vicinity of the four sides of the plane portion 12a; i.e., an outer peripheral region of the plane portion 12a) in a downwardly facing condition. The lower frame portion 12c is symmetrical with the upper frame portion 12b with respect to a centerline CL which halves the thickness of the plane portion 12a. Accordingly, the lower frame portion 12c has a perimetric frame portion 12c1 and a jutting portion 12c2 which are identical in shape with the perimetric frame portion 12b1 and the jutting portion 12b2, respectively. However, the jutting portion 12c2 is formed at one of two corner portions of the plane portion 12a which neighbor the corner portion of the plane portion 12a where the jutting portion 12b2 is formed.

Figure 4:
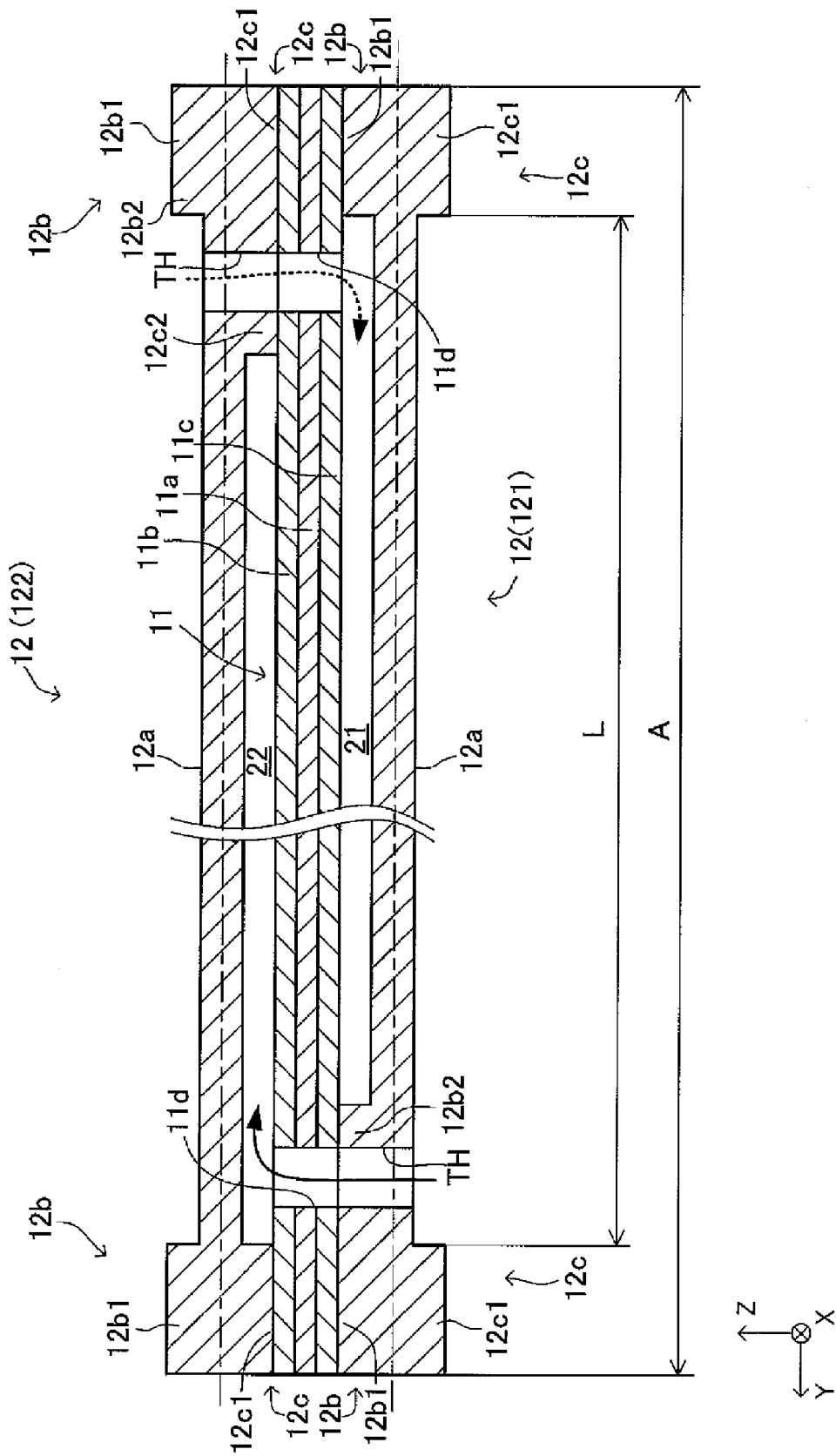
FIG. 4 is a vertical sectional view of a sheet body shown in FIG. 1 and two support members in a state of supporting the sheet body therebetween, the sectional view being taken along a plane which includes line 2-2 of FIG. 2 and is in parallel with a y-z plane.

FIG. 4 is a vertical sectional view of the sheet body 11 and a pair of the support members 12 in a state of supporting (holding) the sheet body 11 therebetween, the sectional view being taken along a plane which includes line 2-2 of FIG. 2 parallel with the y-axis and is in parallel with a y-z plane. As mentioned previously, the fuel cell 10 is formed by stacking the sheet bodies 11 and the support members 12 in alternating layers.

For convenience of description, of the paired support members 12, the support member 12 adjacent to the lower side of the sheet body 11 is referred to as a lower support member 121, and the support member 12 adjacent to the upper side of the sheet body 11 is referred to as an upper support member 122. As shown in FIG. 4, the lower support member 121 and the upper support member 122 are coaxially arranged such that the lower frame portion 12c of the upper support member 122 is located above the upper frame portion 12b of the lower support member 121 in a mutually facing manner.

The overall perimetric portion of the sheet body 11 is sandwiched between the upper frame portion 12b of the lower support member 121 and the lower frame portion 12c of the upper support member 122. At this time, the sheet body 11 is arranged such that the air electrode layer 11c faces the upper surface of the plane portion 12a of the lower support member 121 and such that the fuel electrode layer 11b faces the lower surface of the plane portion 12a of the upper support member 122.

The lower surface of a perimetric portion of the sheet body 11 (i.e., the lower surface of a perimetric portion of the air electrode layer 11c) is in contact with the upper surface of the upper frame portion 12b (specifically, the upper surface of the perimetric frame portion 12b1 and the upper surface of the jutting portion 12b2) of the lower support member 121 and is bonded to the upper frame portion 12b by means of a predetermined electrically conductive bonding agent or the like. Similarly, the upper surface of a perimetric portion of the sheet body 11 (i.e., the upper surface of a perimetric portion of the fuel electrode layer 11b) is in contact with the lower surface of the lower frame portion 12c (specifically, the lower surface of the perimetric frame portion 12c1 and the lower surface of the jutting portion 12c2) of the upper support member 122 and is bonded to the lower frame portion 12c by means of a predetermined electrically conductive bonding agent or the like.

In other words, the upper and lower surfaces of the overall perimetric portion of the sheet body 11 are bonded to the lower frame portion 12c of the upper support member 122 and to the upper frame portion 12b of the lower support member 121, respectively. Notably, the sheet body 11 may be bonded to the support members 11 in such a manner as to completely disable relative movement or in such a manner as to allow some relative movement only at a predetermined temperature or higher.

Thus, as shown in FIG. 4, the upper surface of the plane portion 12a of the lower support member 121, the inner wall surface of the upper frame portion 12b (the perimetric frame portion 12b1 and the jutting portion 12b2) of the lower support member 121, and the lower surface of the air electrode layer 11c of the sheet body 11 define an air flow channel 21 to which a gas that contains oxygen is supplied. As indicated by the broken-line arrow of FIG. 4, the gas that contains oxygen flows into the air flow channel 21 through the through-hole TH of the upper support member 122 and the cell through-hole 11d of the sheet body 11.

Also, the lower surface of the plane portion 12a of the upper support member 122, the inner wall surface of the lower frame portion 12c (the perimetric frame portion 12c1 and the jutting portion 12c2) of the upper support member 122, and the upper surface of the fuel electrode layer 11b of the sheet body 11 define a fuel flow channel 22 to which a fuel that contains hydrogen is supplied. As indicated by the solid arrow of FIG. 4, the fuel flows into the fuel flow channel 22 through the through-hole TH of the lower support member 121 and the cell through-hole 11d of the sheet body 11.

Figure 5:
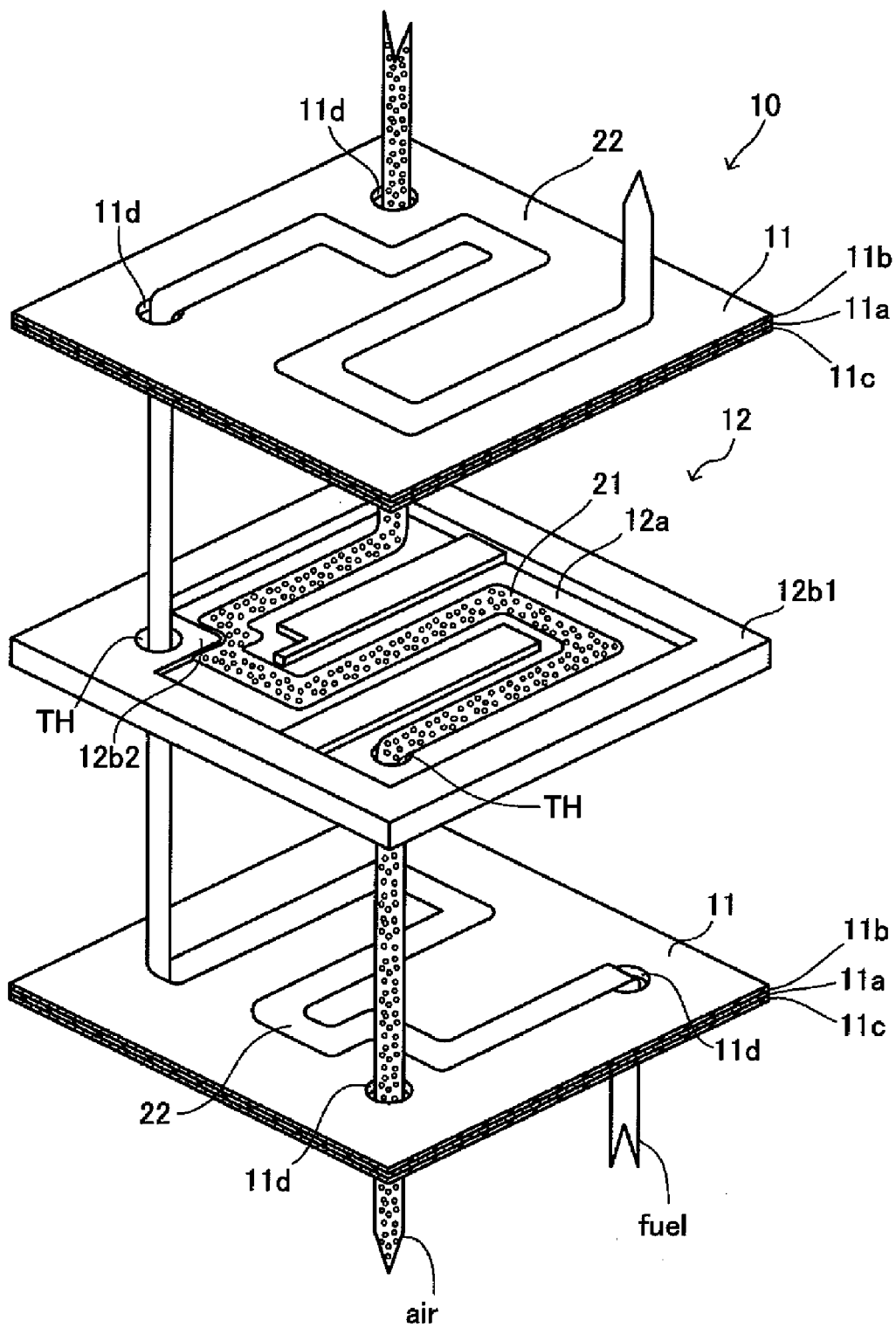
FIG. 5 is a view for explaining flow of fuel and air in the fuel cell shown in FIG. 1.

In the thus-configured fuel cell 10, as shown in FIG. 5, for example, a fuel is supplied to the fuel flow channel 22 formed between the fuel electrode layer 11b of the sheet body 11 and the lower surface of the plane portion 12a of the support member 12, and air is supplied to the air flow channel 21 formed between the air electrode layer 11c of the sheet body 11 and the upper surface of the plane portion 12a of the support member 12, whereby electricity is generated according to Chemical Reaction Formulas (1) and (2) shown below.

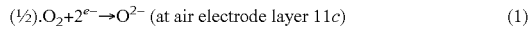

$(\tfrac{1}{2}) \cdot O_2 + 2e^- \rightarrow O^{2-}$ (at air electrode layer 11c)  (1)

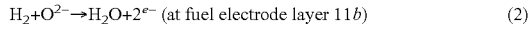

$H_2 + O^{2-} \rightarrow H_2O + 2e^-$ (at fuel electrode layer 11b)  (2)

Figure 6:
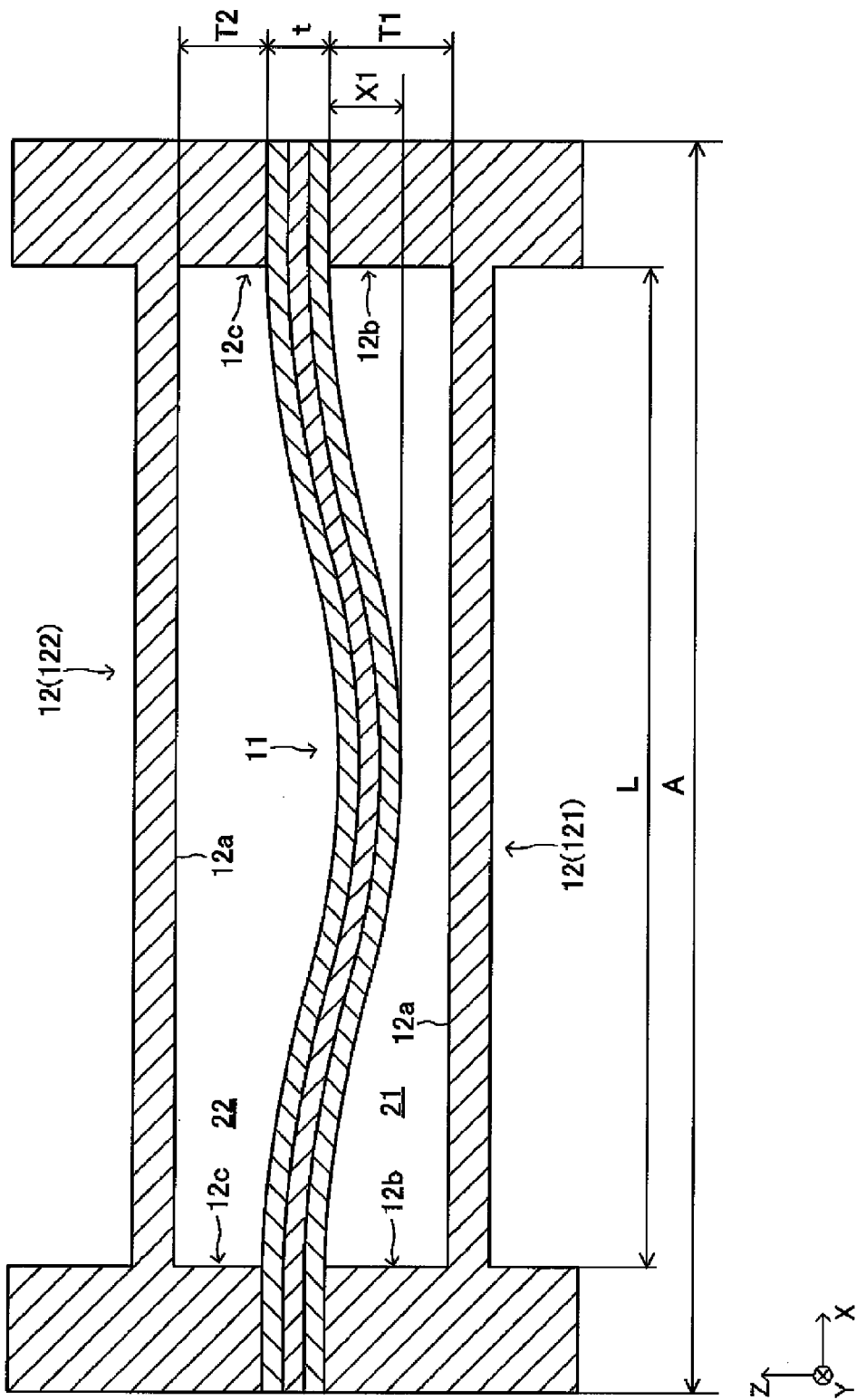
FIG. 6 is a schematic view corresponding to FIG. 4, showing how the sheet body of the fuel cell shown in FIG. 1 is warped at room temperature.

Warp of Sheet Body 11:

Next, warp of the sheet body 11 will be described. FIG. 6 is a schematic, vertical sectional view of the sheet body 11 and a pair of the support members 12 in a state of supporting (holding) the sheet body 11 therebetween at room temperature, the sectional view being taken along a plane which includes line 3-3 of FIG. 2 parallel with the x-axis and is in parallel with the x-z plane. Line 3-3 passes through the center of the planar shape (square shape) of the support member 12 (the center of the planar shape (square shape) of the sheet body 11).

One side of the planar shape (square shape) of the sheet body 11 has a length A of, in the present embodiment, 5 mm to 200 mm inclusive. The thickness t of the sheet body 11 is distributed uniformly throughout the sheet body 11 and is, in the present embodiment, 20 μm to 500 μm inclusive. The electrolyte layer 11a, the fuel electrode layer 11b, and the air electrode layer 11c have thicknesses of, for example, 1 μm to 50 μm inclusive, 5 μm to 500 μm inclusive, and 5 μm to 200 μm inclusive, respectively.

The height T1 of the air flow channel 21 as measured perpendicularly to a planar direction of the sheet body 11 (hereinafter, may be referred to merely as the "planar direction") is equal to the distance between the upper surface of the plane portion 12a of the lower support member 121 and the upper surface of the upper frame portion 12b of the lower support member 121 as measured perpendicularly to the planar direction and is, in the present embodiment, 50 μm to 700 μm inclusive. In the present embodiment, the height T2 of the fuel flow channel 22 (i.e., the distance between the lower surface of the plane portion 12a of the upper support member 122 and the lower surface of the lower frame portion 12c of the upper support member 122 as measured perpendicularly to the planar direction) is lower than the height T1 of the air flow channel 21. One side of the planar shape (square) of the plane portion 12a of the support member 12 has a length L of, in the present embodiment, 4 mm to 190 mm inclusive.

As understood from FIG. 6, at room temperature (and under the condition that no gases are supplied), the sheet body 11 is warped downward (i.e., toward the air-electrode-layer-11c side) such that the center of the planar shape (square) becomes the lowest point (bottom portion). Hereinafter, the downward warp height (specifically, the distance between a perimetric portion of the sheet body 11 and the bottom portion as measured perpendicularly to the planar direction) of the sheet body 11 at room temperature is referred to as the "room-temperature warp height X1" (see FIG. 6; X1>0).

The thus-configured fuel cell 10 generates electricity by utilizing the chemical reactions according to the above Chemical Reaction Formulas (1) and 2). However, since the fuel cell (SOFC) 10 generates electricity through utilization of oxygen conductivity of the solid electrolyte layer 11a, the working temperature of the fuel cell 10 is generally 600° C. or higher. Accordingly, the temperature of the fuel cell 10 is raised from room temperature to the working temperature (e.g., 800° C.) by means of an external heating mechanism (e.g., a heating mechanism which uses a resistance heater or a heating mechanism which utilizes heat generated through combustion of a fuel gas).

As mentioned previously, the magnitude relationship of thermal expansion coefficient is present among the layers in the sheet body 11 (thermal expansion coefficient of the fuel electrode layer 11b>thermal expansion coefficient of the electrolyte layer 11a≅thermal expansion coefficient of the air electrode layer 11c). Thus, in the course of raising temperature as mentioned above, the upper side (the surface of the fuel electrode layer 11b) of the sheet body 11 becomes greater in expansion along the planar direction than the lower side (the surface of the air electrode layer 11c) of the sheet body 11. As a result, in the interior of the sheet body 11, variation in internal stress (thermal stress) causes an upward force to be generated as indicated by the black bold arrow in FIG. 7. Thus, the downward warp height of the sheet body 11 gradually lessens.

Additionally, as mentioned previously, there exists the magnitude relationship of thermal expansion coefficient between the support member 12 and the sheet body 11 (thermal expansion coefficient of the support member 12>thermal expansion coefficient of sheet body 11). Thus, in the course of raising temperature as mentioned above, the support member 12 becomes greater in expansion along the planar direction than the sheet body 11. However, the overall perimetric portion of the sheet body 11 is bonded to the support members 12. As a result, as indicated by the inline arrow in FIG. 7, the sheet body 11 receives tensile forces from the support members 12 along the planar direction. This also causes gradual lessening of the downward warp height of the sheet body 11.

That is, in the course of raising temperature as mentioned above, because of the magnitude relationship of thermal expansion coefficient among the layers in the sheet body 11 and the magnitude relationship of thermal expansion coefficient between the support member 12 and the sheet body 11, the downward warp height of the sheet body 11 gradually lessens. However, even when the temperature of the fuel cell 10 reaches the working temperature, the sheet body 11 is still warped downward (under the condition that no gases are supplied). When the downward warp height of the sheet body 11 at the working temperature (and under the condition that no gases are supplied) is referred to as the "working-temperature warp height X2" (see FIG. 7), the magnitude relationship $0<X2<X1$ holds.

Figure 7:
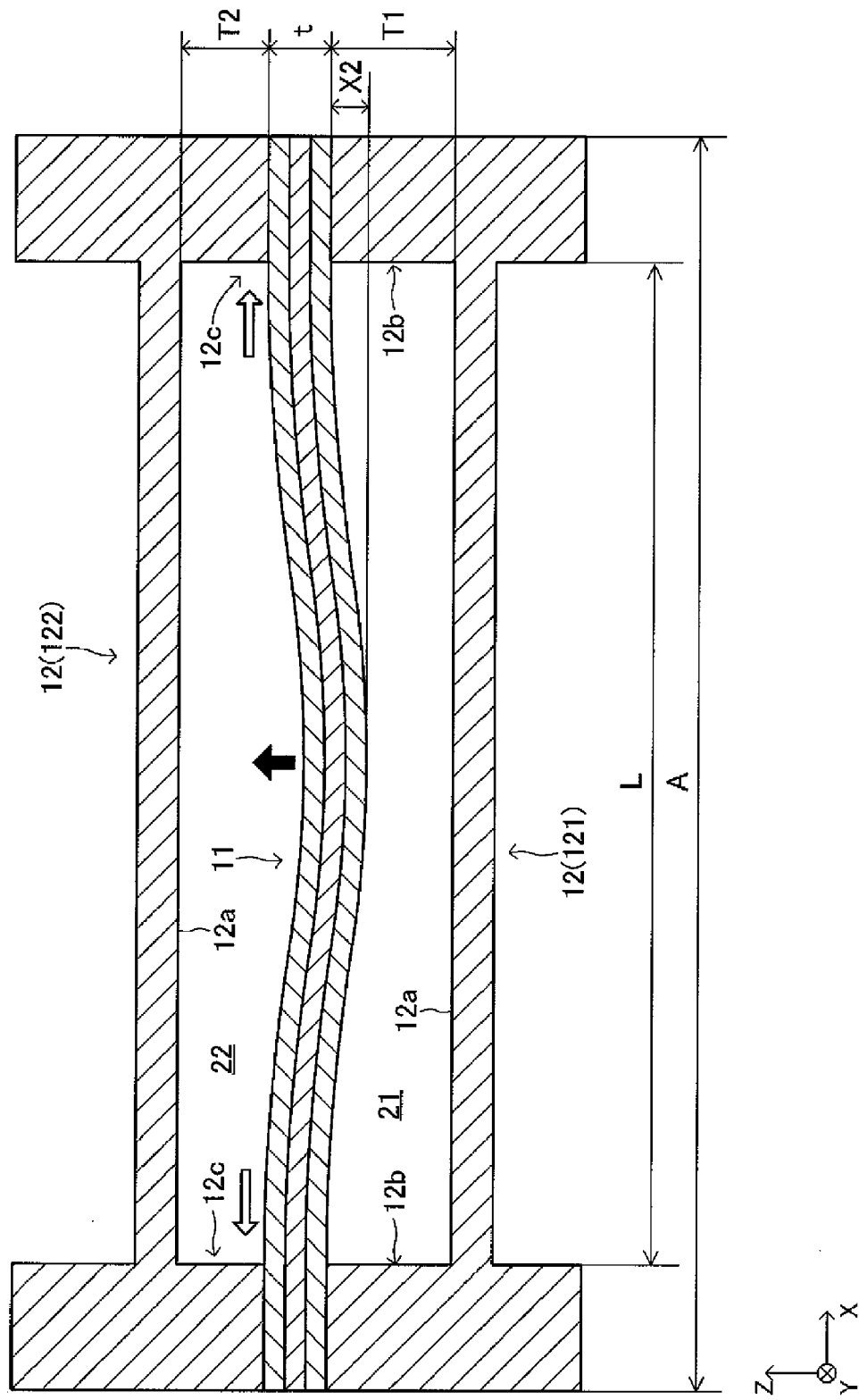
FIG. 7 is a schematic view corresponding to FIG. 4, showing how the sheet body of the fuel cell shown in FIG. 1 is warped at the working temperature.
Figure 8:
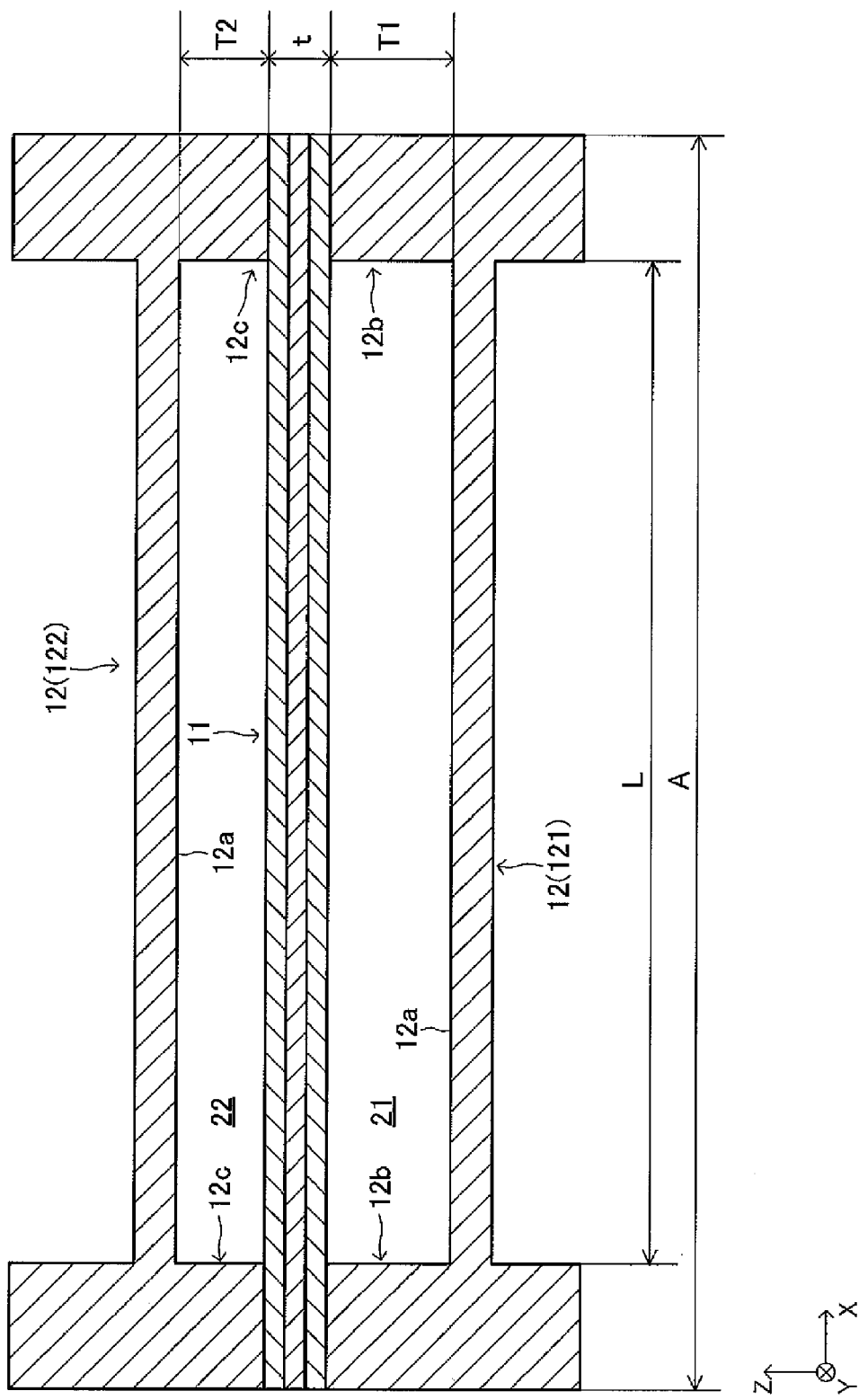
FIG. 8 is a schematic view corresponding to FIG. 4, showing as a comparative example the case where the sheet body is not warped at the working temperature.

As mentioned above, in the present embodiment, at the working temperature, the sheet body 11 is warped downward (i.e., toward the air-electrode-layer-11c side) as shown in FIG. 7. As a result, as compared with a fuel cell configured such that the sheet body 11 is not warped at the working temperature as shown in FIG. 8, at the working temperature, the sheet body 11 is less likely to be deformed upon subjection to an external force oriented perpendicularly to the planar direction (warp-induced deformation restraint effect).

Accordingly, even when the pressure difference between air flowing through the air flow channel 21 and a fuel gas flowing through the fuel flow channel 22 acts as an external force on the sheet body 11, the sheet body 11 is unlikely to be deformed.

Meanwhile, with the view to the ratio between oxygen molecules and hydrogen molecules to be consumed according to Chemical Reaction Formulas (1) and (2) and the proportion of oxygen molecules in air, generally, the flow rate of air to be supplied to the air flow channel 21 is set higher than that of a fuel gas to be supplied to the fuel flow channel 22. Accordingly, the pressure of air to be supplied to the air flow channel 21 becomes higher than that of the fuel gas to be supplied to the fuel flow channel 22. As a result, the pressure difference causes an upward external force (i.e., an external force oriented toward the fuel-electrode-layer-11b side from the air-electrode-layer-11c side) to act on the sheet body 11.

Meanwhile, in the case where the sheet body 11 is warped downward (i.e., toward the air-electrode-layer-11c side) as in the present embodiment, the "warp-induced deformation restraint effect" can be exhibited to a greater extent upon imposition of an upward external force on the sheet body 11 than upon imposition of a downward external force on the sheet body 1. Thus, according to the present embodiment, in the case where the flow rate of air to be supplied to the air flow channel 21 is set higher than that of the fuel gas to be supplied to the fuel flow channel 22, the "warp-induced deformation restraint effect" can be exhibited to a greater extent.

As a result, even when the pressure difference arises among a plurality of the sheet bodies 11 in the fuel cell 10 having a stack structure, there can be restrained variation in the quantity of deformation of the sheet body 11 among the sheet bodies 11 caused by variation in the pressure difference among the sheet bodies 11. Therefore, the fuel cell 10 as a whole can stably exhibit expected electricity-generating characteristics.

Next will be described a preferable relationship between the room-temperature warp height X1 and the height T1 of the air flow channel 21. For study of the relationship, the value X1/T1 will be introduced. Hereinafter, the value is referred to as the "room-temperature warp height ratio."

Preferably, the room-temperature warp height ratio is 0.05 to 0.8 inclusive. This is from the following reason. According to our findings of studies, when the room-temperature warp height ratio is less than 0.05, the working-temperature warp height X2 becomes very low; as a result, the sheet body 11 fails to sufficiently exhibit the deformation restraint effect against an external force induced by the aforementioned pressure difference. By contrast, when the room-temperature warp height ratio is in excess of 0.8, the working-temperature warp height X2 still remains considerably high, and thus the sectional area of the air flow channel 21 reduces, causing a great increase in pressure loss of air which flows through the air flow channel 21.

Next will be described the experiment which verified the above. The experiment used a plurality of samples which differed in warm-temperature warp height ratio and which each used a sheet body (an electrolyte-support-type cell) having a square shape as viewed in plane, a length A of one side of 30 mm, a 30 μm-thick electrolyte layer, a 15 μm-thick fuel electrode layer, and a 15 μm-thick air electrode layer. The warm-temperature warp height ratio was adjusted by changing properties (temperature-dependent viscosity, thermal expansion coefficient, thickness, Young's modulus, etc.) of a bonding agent used to bond a perimetric portion of the sheet body and frame portions of the upper and lower support members together.

When the room-temperature warp height ratio is less than 0.05, the sheet body fails to sufficiently exhibit the warp-induced deformation restraint effect. Accordingly, when the gas flow rate was abruptly changed (i.e., when the pressure difference varied abruptly), the quantity of deformation of the sheet body varied greatly, resulting in breakage of the sheet body. When the room-temperature warp height ratio was 0.05 or higher, the sheet body was not broken, thereby confirming the sheet body's exhibition of the warp-induced deformation restraint effect.

Meanwhile, when the room-temperature warp height ratio is in excess of 0.8, the minimum sectional area of the air flow channel reduces considerably. Accordingly, the pressure loss of air flow in the air flow channel increased significantly. Additionally, it was found that, due to an increase in the difference between the maximum sectional area and the minimum sectional area of the air flow channel, the distribution of air flow in the air flow channel became nonuniform, resulting in a significant drop in electricity-generating efficiency per unit area as viewed in plane. When the room-temperature warp height ratio is 0.8 or less, neither a significant increase in pressure loss in the air flow channel nor a significant drop in electricity-generating efficiency occurred. Thus, the room-temperature warp height ratio was preferably 0.05 to 0.8 inclusive.

The above-mentioned experiment was carried out under the condition that the sheet bodies had a constant thickness. Meanwhile, it has also been found that, at a thickness of the sheet body of 20 μm to 500 μm inclusive, for the same reason, the room-temperature warp height ratio is preferably 0.05 to 0.8 inclusive. Next will be described the experiment which verified this. This experiment was carried out by using electrolyte-support-type cells and fuel-electrode-support-type cells as sheet bodies and using the sheet-body thickness as a parameter.

This experiment was carried out by using one-layer (one-sheet-body) stacks while the sheet-body thickness was varied. The sheet body and the support members were bonded (sealed) through thermal treatment at 850° C. such that softened glass was used for bonding between a perimetric portion of the sheet body and frame portions of the support members and such that crystallized glass was used for covering of the outer surface of the stack.

The room-temperature warp height X1 of the sheet body as measured after completion of the stack was adjusted by changing glass bonding conditions, and the shape, hardness, and the like of current-collecting meshes disposed respectively in two gas flow channels (a fuel flow channel and an air flow channel) formed in the one-layer stack. The room-temperature warp height X1 of the sheet body was confirmed as follows. Hardening resin was injected into the two gas flow channels of the completed stack for holding the shape of the sheet body intact. In this condition, the stack was cut along a vertical plane. The thus-obtained section of the sheet body was observed.

In this experiment, the shape stability of the sheet body against the above-mentioned "pressure difference" was evaluated. The evaluation method employed is as follows. The flow rate of a gas flowing through the fuel flow channel was maintained at a constant value. In this condition, the flow rate of a gas flowing through the air flow channel was varied, and variation in pressure difference (pressure loss) between the inflow hole and the outflow hole of the fuel flow channel was monitored. A small variation in the pressure loss means that variation in the quantity of deformation of the sheet body caused by variation in the above-mentioned "pressure difference" is small. This means that the shape stability of the sheet body against the "pressure difference" is high (i.e., the aforementioned "warp-induced deformation restraint effect" is high).

This evaluation was carried out at room temperature and used nitrogen gas as a gas to be supplied to the fuel flow channel and to the air flow channel. As mentioned previously, the SOFC is actually used at a high working temperature of about 600° C. to 800° C. with hydrogen gas and air being supplied to the fuel flow channel and the air flow channel, respectively. However, for convenience of experiment, this experiment employed a method of reproducing the actual working conditions of the SOFC at room temperature.

That is, in order to reproduce a high-temperature pressure loss in the flow channel, a gas flow condition employed was determined such that the product of viscosity and a flow rate of gas in the actual working conditions became equal to the product of viscosity and a flow rate of a simulation gas (nitrogen) at room temperature.

Specifically, at room temperature, in a state in which the flow rate of nitrogen supplied to the fuel flow channel was maintained at a constant value of 250 sccm, while the flow rate of nitrogen supplied to the air flow channel was varied over a range of 250 sccm to 2,000 sccm, variation (stability) of pressure loss in the fuel flow channel was evaluated. The results of evaluation are shown in Table 1.

TABLE 1

| Sheet body thickness | Warp height (X1) | Air flow channel height (T1) | Ratio (X1/T1) | Evaluation | Judgment |
| --- | --- | --- | --- | --- | --- |
| 18 μm | Unknown | 300 μm | — | Breakage of sheet body | Poor |
| 20 μm | 100 μm | 300 μm | 0.33 | Stable Pressure loss | Good |
| 50 μm | 165 μm | 300 μm | 0.55 | Stable Pressure loss | Good |
| 120 μm | 180 μm | 250 μm | 0.72 | Stable Pressure loss | Good |
| 150 μm | 200 μm | 250 μm | 0.8 | Stable Pressure loss | Good |
| 160 μm | 210 μm | 250 μm | 0.84 | Great increase in pressure loss | Poor |
| 255 μm | 120 μm | 400 μm | 0.3 | Stable Pressure loss | Good |
| 358 μm | 98 μm | 600 μm | 0.16 | Stable Pressure loss | Good |
| 482 μm | 75 μm | 350 μm | 0.21 | Stable Pressure loss | Good |
| 650 μm | 35 μm | 700 μm | 0.05 | Stable Pressure loss | Good |
| 700 μm | 10 μm | 200 μm | 0.05 | Stable Pressure loss | Good |
| 800 μm | 10 μm | 250 μm | 0.04 | Large pressure variation | Poor |
| 1,000 μm | 10 μm | 350 μm | 0.03 | Large pressure variation | Poor |

As understood from Table 1, when the room-temperature warp height ratio is less than 0.05, variation in the above-mentioned pressure loss is large, indicating that the aforementioned "warp-induced deformation restraint effect" fails to be sufficiently exhibited. When the room-temperature warp height ratio is 0.05 or higher, variation in the pressure loss is small; i.e., the pressure loss is stabilized, indicating that the "warp-induced deformation restraint effect" can be sufficiently exhibited.

Meanwhile, when the room-temperature warp height ratio is in excess of 0.8, pressure loss in the air flow channel has significantly increased. By contrast, it has been confirmed that, when the room-temperature warp height ratio is 0.8 or less, pressure loss in the air flow channel does not exhibit a significant increase. Therefore, when the thickness of the sheet body is 20 μm to 500 μm inclusive, the room-temperature warp height ratio can be said to be preferably 0.05 to 0.8 inclusive.

Figure 9:
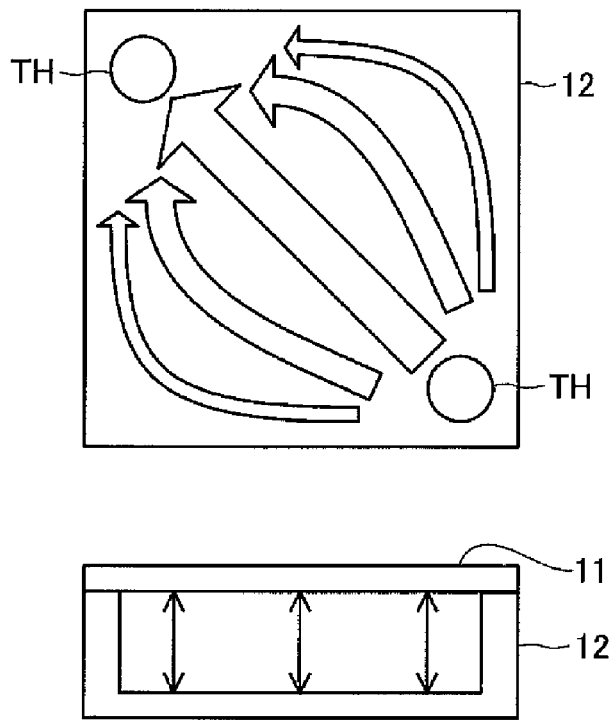
FIG. 9 is a schematic view showing the flow velocity distribution of air within the air flow channel in the case where the sheet body is not warped.

Now, as shown in FIG. 9, let's assume the case where the air flow channel has a square shape as viewed in plane and has an inflow hole and an outflow hole (corresponding to the aforementioned through-hole TH, etc.) which are disposed at corresponding diagonally opposite corner portions of the air flow channel (i.e., the inflow hole and the outflow hole are arranged such that a line segment connecting the inflow hole and the outflow hole passes through a central portion of the air flow channel). In the case of FIG. 9, the sheet body 11 is not warped; accordingly, the height of the air flow channel is distributed uniformly throughout the air flow channel. In FIG. 9, the thickness of individual arrows indicate the magnitude of air flow velocity (accordingly, air flow rate) (this also applies to FIG. 10).

In this case, as shown in FIG. 9, as viewed in plane, the air flow velocity is the highest in a central portion of the air flow channel and reduces with the distance from the central portion. That is, nonuniform distribution of air flow velocity within the air flow channel can arise. When the degree of nonuniform distribution of the air flow velocity is large, as shown by the characteristic curve L1 in FIG. 11, the output density of the SOFC is not influenced in a condition of low air utilization rate Ua; however, the output density of the SOFC is apt to drop in a condition of high air utilization rate Ua. Conceivably, this is because, when the degree of nonuniform distribution of the air flow velocity is large, the efficiency of utilization of air in electricity-generating reactions is low.

Figure 10:
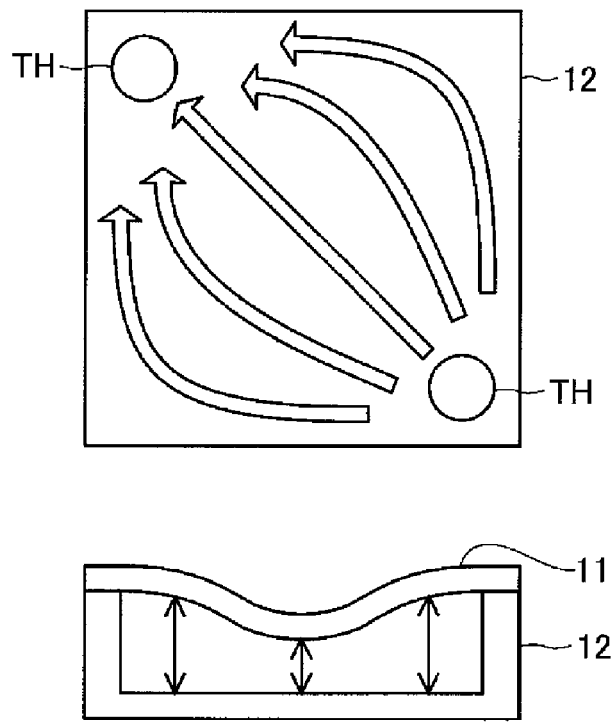
FIG. 10 is a schematic view showing the flow velocity distribution of air within the air flow channel in the case where the sheet body is warped.

Meanwhile, as shown in FIG. 10, let's assume the case where the sheet body 11 is warped downward (toward the air-electrode-layer side), and the height of the air flow channel lowers toward a central portion of the air flow channel. In this case, in contrast to the case of FIG. 9 where the sheet body 11 is not warped, as viewed in plane, an air-flow-velocity-reducing action can arise in a central portion of the air flow channel, whereas an air-flow-velocity-increasing action can arise in a region around the central portion of the air flow channel. As a result, as shown in FIG. 10, the degree of nonuniform distribution of the air flow velocity within the air flow channel can be restrained.

Figure 11:
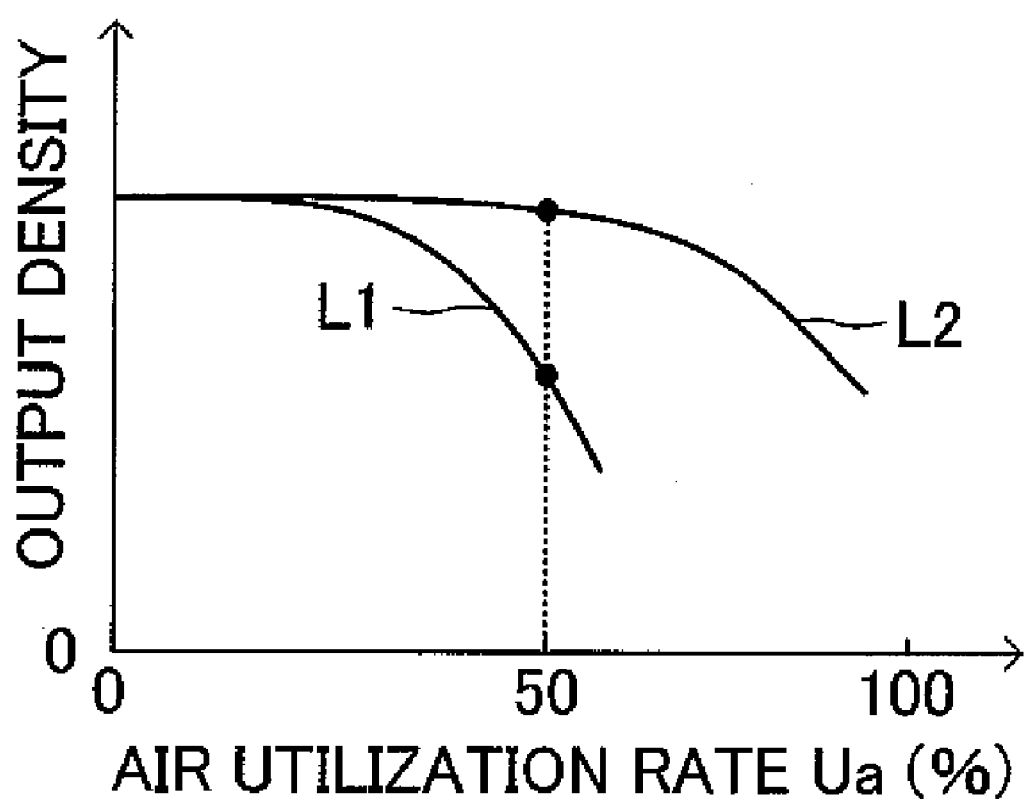
FIG. 11 is a graph showing the relationship between an air utilization rate and the output of an SOFC.

When the degree of nonuniform distribution of the air flow velocity is small, as shown by the characteristic curve L2 in FIG. 11, the output density of the SOFC is unlikely to drop even in a condition of high air utilization rate Ua, as well as in a condition of low air utilization rate Ua. In other words, when the sheet body 11 is warped downward (toward the air-electrode-layer side), the output density of the SOFC in a condition of high air utilization rate Ua is improved. This effect is referred to as the "warp-induced output enhancement effect." Conceivably, this is because, when the degree of nonuniform distribution of the air flow velocity is lessened, the efficiency of utilization of air in electricity-generating reactions is enhanced.

Also, it has been found that, in view of the "warp-induced output enhancement effect," the room-temperature warp height ratio is preferably 0.05 to 0.8 inclusive. Next will be described the experiment which verified this.

In this experiment, under the condition that a fuel gas which flows through the fuel flow channel is abundantly available, the fuel utilization rate was fixed to a low value of 5%. In this condition, the utilization rate Ua of air flowing through the air flow channel was varied for evaluation of the output characteristic of the SOFC. Specifically, under the condition that current was maintained at a constant value of 5 A, while the feed rate of air was varied, the output voltage of the SOFC was measured. From the results of measurement, an output voltage at an air utilization rate Ua of 50% was obtained. On the basis of the thus-obtained output voltage, the output characteristic of the SOFC was evaluated. When the output voltage is low (i.e., the output (=voltage×current) of the SOFC is low), this means that the "warp-induced output enhancement effect" is small.

This evaluation was made at an ambient temperature of 800° C. by using fuel-electrode-support-type cells having the same thickness as the sheet bodies while the room-temperature warp height ratio was varied. The results of evaluation are shown in Table 2.

TABLE 2

| Sheet body thickness | Warp height (X1) | Air flow channel height (T1) | Ratio (X1/T1) | Output voltage | Evaluation | Judgment |
|---|---|---|---|---|---|---|
| 150 μm | 15 μm | 400 μm | 0.04 | 0.30 V | No output enhancement | Poor |
| 150 μm | 15 μm | 350 μm | 0.04 | 0.35 V | No output enhancement | Poor |
| 150 μm | 15 μm | 300 μm | 0.05 | 0.69 V | Stable output | Good |
| 150 μm | 50 μm | 300 μm | 0.17 | 0.72 V | Stable output | Good |
| 150 μm | 150 μm | 250 μm | 0.6 | 0.76 V | Stable output | Good |
| 150 μm | 150 μm | 500 μm | 0.3 | 0.65 V | Stable output | Good |
| 150 μm | 200 μm | 300 μm | 0.67 | 0.73 V | Stable output | Good |
| 150 μm | 210 μm | 400 μm | 0.53 | 0.71 V | Stable output | Goad |
| 150 μm | 230 μm | 600 μm | 0.38 | 0.68 V | Stable output | Good |
| 150 μm | 220 μm | 275 μm | 0.8 | 0.70 V | Stable output | Good |
| 150 μm | 250 μm | 300 μm | 0.83 | 0.73 V | Great increase in pressure loss | Poor |
| 150 μm | 250 μm | 280 μm | 0.89 | 0.67 V | Great increase in pressure loss | Poor |

As understood from Table 2, when the room-temperature warp height ratio is less than 0.05, enhancement of output is not recognized, indicating that the aforementioned "warp-induced output enhancement effect" fails to be sufficiently exhibited. When the room-temperature warp height ratio is 0.05 or higher, enhancement of output is sufficiently recognized, and the degree of drop in output in relation to an increase in air utilization rate Ua is small (output is stable), indicating that the "warp-induced output enhancement effect" can be sufficiently exhibited.

Meanwhile, as in the case of the above-mentioned experiment on the "warp-induced deformation restraint effect," when the room-temperature warp height ratio is in excess of 0.8, pressure loss in the air flow channel has significantly increased. By contrast, it has been confirmed that, when the room-temperature warp height ratio is 0.8 or less, pressure loss in the air flow channel does not exhibit a significant increase. Therefore, in view of the "warp-induced output enhancement effect" as well as the "warp-induced deformation restraint effect," the room-temperature warp height ratio can be said to be preferably 0.05 to 0.8 inclusive.

Next will be described an example method of manufacturing the sheet body 11 which is warped downward (toward the air-electrode-layer-11c side) at room temperature as mentioned above. In the case where an electrolyte-support-type cell is manufactured as the sheet body 11, a sheet (which is to become the fuel electrode layer 11b) is formed by a printing process on the upper surface of a ceramics sheet (YSZ tape) prepared by a green sheet process; the resultant laminate is fired at 1,400° C. for one hour; a sheet (which is to become the air electrode layer 11c) is formed similarly by a printing process on the lower surface of the resultant fired body; and the resultant laminate is fired at 1,200° C. for one hour. In the case where a fuel-electrode-support-type cell is manufactured as the sheet body 11, a ceramic sheet (tape of YSZ) is laminated on the lower surface of a sheet (which is to become the fuel electrode layer 11b) prepared by a green sheet process; the resultant laminate is fired at 1,400° C. for one hour; a sheet (which is to become the air electrode layer 11c) is formed by a printing process on the lower surface of the resultant fired body; and the resultant laminate is fired at 1,200° C. for one hour.

Meanwhile, as mentioned previously, the magnitude relationship of thermal expansion coefficient is present among the layers in the sheet body 11 (thermal expansion coefficient of the fuel electrode layer 11b>thermal expansion coefficient of the electrolyte layer 11a≅thermal expansion coefficient of the air electrode layer 11c). Thus, in the course of lowering of temperature after firing, the upper side (the surface of the fuel electrode layer 11b) of the sheet body 11 becomes greater in contraction along the planar direction than the lower side (the surface of the air electrode layer 11c) of the sheet body 11. Through utilization of this principle, upon completion of lowering of temperature after firing, the sheet body 11 is warped downward (i.e., toward the air-electrode-layer-11c side) at room temperature. Therefore, the sheet body 11 warped downward at the room-temperature can be readily manufactured.

As described above, the solid oxide fuel cell 10 according to the embodiment of the present invention is such that, at the working temperature, the sheet bodies 11 are warped downward (i.e., toward the air-electrode-layer-11c side) (see FIG. 7). Accordingly, as compared with a fuel cell having such a configuration that the sheet bodies 11 are not warped at the working temperature (see FIG. 8), the sheet bodies 11 are less likely to be deformed at the working temperature even upon subjection to an external force oriented perpendicularly to the planar direction. As a result, even when the pressure difference between air flowing through the air flow channel 21 and a fuel gas flowing through the fuel flow channel 22 varies among a plurality of the sheet bodies 11 in the fuel cell 10 having a stack structure, there can be restrained variation in the quantity of deformation of the sheet body 11 among the sheet bodies 11 caused by variation in the pressure difference among the sheet bodies 11. Thus, the fuel cell 10 as a whole can stably exhibit expected electricity-generating characteristics. Additionally, by virtue of the above-mentioned "warp-induced output enhancement effect" associated with the fact that the sheet bodies 11 are warped downward (i.e., toward the air-electrode-layer-11c side), even when the air utilization rate is high, the output of the SOFC is unlikely to drop.

The present invention is not limited to the above-described embodiment, but can be modified in various other forms without departing from the scope of the present invention. For example, the fuel electrode layer 11b can be formed from, for example, platinum, platinum-zirconia cermet, platinum-cerium-oxide cermet, ruthenium, or ruthenium-zirconia cermet.

Also, the air electrode layer 11c can be formed from, for example, lanthanum-containing perovskite-type complex oxide (e.g., lanthanum manganite or lanthanum cobaltite). Lanthanum cobaltite and lanthanum manganite may be doped with strontium, calcium, chromium, cobalt (in the case of lanthanum manganite), iron, nickel, aluminum, or the like. Also, the air electrode layer 11c may be formed from palladium, platinum, ruthenium, platinum-zirconia cermet, palladium-zirconia cermet, ruthenium-zirconia cermet, platinum-cerium-oxide cermet, palladium-cerium-oxide cermet, or ruthenium-cerium-oxide cermet.

Figure 12:
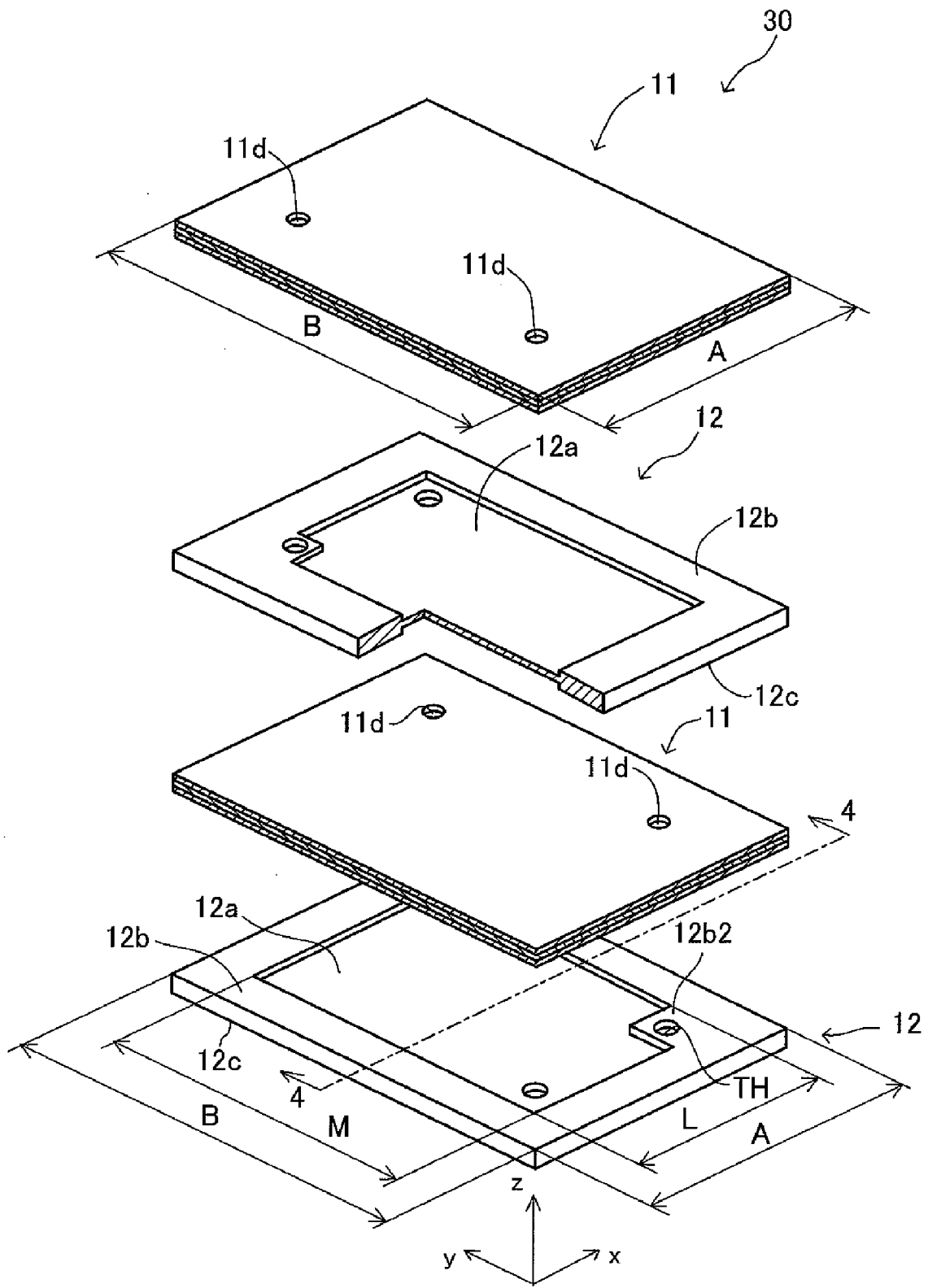
FIG. 12 is an exploded partial, perspective view of a solid oxide fuel cell according to a modification of the embodiment of the present invention.

The sheet body 11 and the support member 12 may have a planar shape of rectangle, circle, ellipse, etc. For example, FIG. 12 is an exploded partial, perspective view of a fuel cell 30 in which the sheet bodies 11 and the support members each have a planar shape of a rectangle having a short-side length A and a long-side length B. In the fuel cell 30, the plane portions 12a of the support members 12 each have a planar shape of a rectangle having a short-side length L and a long-side length M.

In the fuel cell 30, a warp of the sheet body 11 at room temperature appearing on a vertical sectional view of the sheet body 11 and a pair of the support members 12 in a state of supporting (holding) the sheet body 11 therebetween, the sectional view being taken along a plane which includes line 4-4 of FIG. 12 parallel with the x-axis and is in parallel with an x-z plane, is similar to the warp of the sheet body 11 in the fuel cell 10 shown in FIG. 6. The line 4-4 passes through the center of the planar shape (rectangle) of the support member 12 (the center of the planar shape (rectangle) of the sheet body 11). This is because the vertical sectional view which includes the line 4-4 corresponds to the aforementioned "minimum-width vertical section" of the plane portion 12a of the support member 12 and because a major warp of the sheet body 11 tends to appear on a vertical section of the sheet body 11 taken along a plane which includes the "minimum-width vertical section."

Let's assume that, as in the case of the above-described fuel cell 10, in the fuel cell 30, the aforementioned room-temperature warp height ratio is 0.05 to 0.8 inclusive, and the height T of the air flow channel 21 is 50 μm to 700 μm inclusive. In this case, the short-side length L of the above-mentioned rectangle which coincides with the width of the "minimum-width vertical section" is preferably 4 mm to 190 mm inclusive. Through employment of such a short-side length L, the width of the "minimum-width vertical section," which width greatly influences the degree (curvature) of a major warp of the sheet body 11, can be equivalent to that of the fuel cell 10 according to the above-described embodiment. Accordingly, at the working temperature, the degree (curvature) of the sheet body 11 can be equivalent to that of the fuel cell 10 according to the above-described embodiment.

Similarly, in the case where the room-temperature warp height ratio is 0.05 to 0.8 inclusive, and the height T of the air flow channel 21 is 50 μm to 700 μm inclusive and where the sheet body 11 and the plane portion 12a of the support member 12 have a planar shape of circle or ellipse, the diameter of the circle or the minor diameter of the ellipse, which diameter or minor diameter coincides with the width of the "minimum-width vertical section," is preferably 4 mm to 190 mm inclusive. Through employment of such a diameter or minor diameter, the width of the "minimum-width vertical section" can also be equivalent to that of the fuel cell 10; therefore, at the working temperature, the degree (curvature) of the sheet body 11 can be equivalent to that of the fuel cell 10.

What is claimed is:

1. A solid oxide fuel cell comprising:
a single or a plurality of sheet bodies each being a fired laminate of a solid electrolyte layer, a fuel electrode layer formed on an upper surface of the solid electrolyte layer, and an air electrode layer formed on a lower surface of the solid electrolyte layer, and
a plurality of support members for supporting the single or the plurality of sheet bodies, each support member having a plane portion and a frame portion provided along an overall perimeter of the plane portion and thicker than the plane portion,
the single or the plurality of sheet bodies and the plurality of support members being stacked in alternating layers,
wherein each of the sheet bodies is held between an upper support member, which is the support member adjacent to and located above the sheet body, and a lower support member, which is the support member adjacent to and located below the sheet body, such that an overall perimetric portion of the sheet body is sandwiched between the frame portion of the upper support member and the frame portion of the lower support member, whereby a lower surface of the plane portion of the upper support member, an inner wall surface of the frame portion of the upper support member, and an upper surface of the fuel electrode layer of the sheet body define a fuel flow channel to which a fuel gas is supplied, and an upper surface of the plane portion of the lower support member, an inner wall surface of the frame portion of the lower support member, and a lower surface of the air electrode layer of the sheet body define an air flow channel to which a gas that contains oxygen is supplied, and the sheet bodies are warped downward at room temperature and at a working temperature of the solid oxide fuel cell higher than room temperature, and a warp height of each of the sheet bodies along a direction perpendicular to a planar direction of the sheet body is lower at the working temperature than at room temperature.

2. A solid oxide fuel cell according to claim 1, wherein each of the sheet bodies has a thickness of 20 μm to 500 μm inclusive.

3. A solid oxide fuel cell according to claim 1, wherein, in each of the sheet bodies, a thermal expansion coefficient of the fuel electrode layer is higher than that of the solid electrolyte layer, and a thermal expansion coefficient of the air electrode layer is substantially equal to that of the solid electrolyte layer, and a thermal expansion coefficient of the support member is higher than a mean thermal expansion coefficient of the sheet body.

4. A solid oxide fuel cell according to claim 1, wherein, in each of the sheet bodies, a ratio (X1/T1) of the warp height (X1) of the sheet body at room temperature to a height (T1) of the air flow channel along the direction perpendicular to the planar direction of the sheet body under a condition that the warp height of the sheet body is assumed to be zero is 0.05 to 0.8 inclusive.

5. A solid oxide fuel cell according to claim 4, wherein the height (T1) of the air flow channel is 50 μm to 700 μm inclusive.

6. A solid oxide fuel cell according to claim 5, wherein, as viewed in plane, the plane portion of the support member assumes a square shape, a rectangular shape, a circular shape, or an elliptic shape, and a length (L) of one side of the square shape, a length (L) of a short side of the rectangular shape, a diameter (L) of the circular shape, or a minor diameter (L) of the elliptic shape is 4 mm to 190 mm inclusive.

* * * * *